Patented Dec. 9, 1924.

1,518,256

UNITED STATES PATENT OFFICE.

WILLIAM L. D'OLIER, OF PHILADELPHIA, PENNSYLVANIA.

METHOD OF DEWATERING OR FILTERING ACTIVATED SLUDGE AND PRODUCING FERTILIZER.

No Drawing.     Application filed September 28, 1923. Serial No. 665,491.

*To all whom it may concern:*

Be it known that I, WILLIAM L. D'OLIER, a citizen of the United States, residing at Philadelphia, in the county of Philadelphia and State of Pennsylvania, have invented certain new and useful Improvements in Methods of Dewatering or Filtering Activated Sludge and Producing Fertilizer, of which the following is a specification.

My invention relates to methods by which the solids, developed in treatment of sewage by the so-called activated sludge system, may be readily removed from the sludge.

As is well known, the sludge from the activated sludge system contains a flocculent material which is present, however, only in quantities to produce the effect of muddy water. This flocculent material or sludge may be settled in tanks and the clear liquor decanted, but even with the best systems, the remaining water or sludge which cannot be decanted contains only about 2 per cent of this flocculent material. Moreover, this material is of such a character that any slight disturbance of the the water containing it will cause the entire amount of material to be dispersed throughout the mass of water.

By my method I de-water or filter the activated sludge through a bed of garbage tankage which, as is well known, is the material resulting from the digesting, treating or de-greasing of city garbage. Any such reduction system usually involves a treatment with steam. This residue or tankage is somewhat dry, usually having not more than 25 to 30 per cent of moisture.

The filter bed of this tankage through which the water containing the activated sludge is to be passed, may be formed in any of the well-known manners in which filter beds are formed and may be renewed in any of the usual ways.

By the use of this garbage tankage as a filtering medium, I not only provide a medium which is particularly effective for removing the flocculent activated sludge from the water containing it, but I also provide a means by which two waste materials which ought to be disposed of in the same way, if such disposition is to be done usefully, can be carried out effectively and economically. The garbage tankage is ordinarily used as fertilizing material and it is obvious that the activated sludge can also be used as such material, so that when the activated sludge is combined with the tankage, the two may be handled together effectively.

Inasmuch as activated sludge is not always of the same character or in the same condition as to freshness, it may be desirable, in order to change the sludge to a condition in which the garbage tankage will have a greater filtering effect thereon, to treat the sludge with some of the well-known substances used to precipitate the sludge or to coagulate the colloids or to re-activate the sludge by the use of compressed air or mechanical agitation and aeration. Any one or all of these treatments may be used to bring the sludge into the condition in which the filtration through the garbage tankage will be most effective.

It is obvious that my method may be carried out in many different ways and by the use of different systems of filtration, and I do not wish to be limited to any particular system. While I have described my filtering medium as garbage tankage, it will be understood that it may be tankage from the treatment of any similar waste material, such as that from tanneries, and that by "garbage tankage," I intend to include all similar tankage.

I claim:

1. The method of de-watering or filtering activated sludge and obtaining a material suitable for use as a fertilizer, which consists in passing the activated sludge through a filtering bed composed of garbage tankage.

2. The method of de-watering or filtering activated sludge and obtaining a material suitable for use as a fertilizer, which consists in passing the activated sludge through a filtering bed composed of garbage tankage and renewing the filtering bed when it has become impervious to the water.

3. The method of de-watering or filtering activated sludge and obtaining a material suitable for use as a fertilizer, which consists in treating the sludge with a precipitating or coagulating medium and then passing the treated sludge through a filtering bed composed of garbage tankage.

4. A material suitable for use as a fertilizer, comprising a mixture of garbage tankage and the solids from activated sludge.

WILLIAM L. D'OLIER.